No. 679,943. Patented Aug. 6, 1901.
F. BUTCHER.
MEANS FOR PRESERVING FRUITS AND THEIR JUICES.
(Application filed Dec. 22, 1900.)
(No Model.)
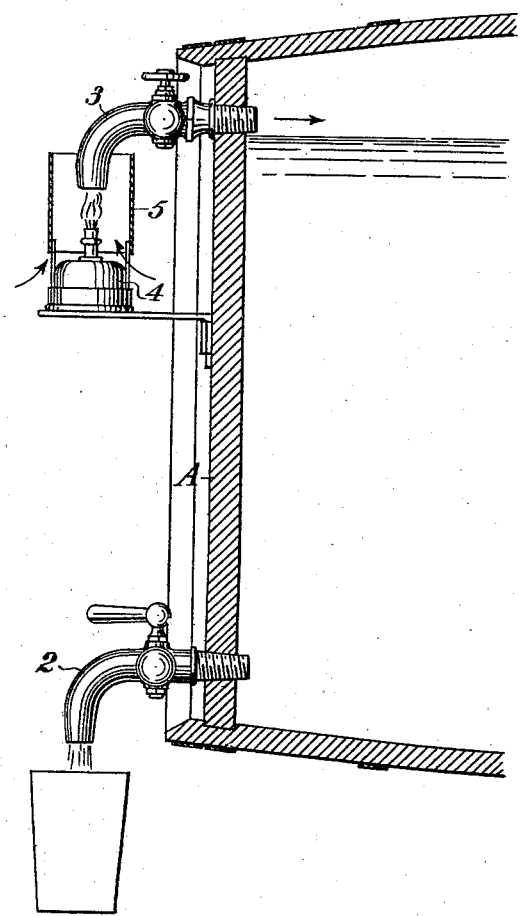
Witnesses,
E. A. Brandau
Inventor,
Frank Butcher
By Dewey Strong & Co.
Attys

UNITED STATES PATENT OFFICE.

FRANK BUTCHER, OF HEALDSBURG, CALIFORNIA.

MEANS FOR PRESERVING FRUITS AND THEIR JUICES.

SPECIFICATION forming part of Letters Patent No. 679,943, dated August 6, 1901.

Application filed December 22, 1900. Serial No. 40,759. (No model.)

*To all whom it may concern:*

Be it known that I, FRANK BUTCHER, a citizen of the United States, residing at Healdsburg, county of Sonoma, State of California, have invented an Improvement in Means for Preserving Fruits and Their Juices; and I hereby declare the following to be a full, clear, and exact description of the same.

My invention relates to an improved means for preventing decay or fermentation of the juices of fruits or of fruits or kindred products in a liquid or semiliquid form after these products have once been hermetically sealed and where it is desirable or necessary at any time to break the seal and remove a part of the preserved contents, whereupon the remainder would be destroyed through contact with the germs in the ordinary air.

My invention consists of means for sterilizing or deoxidizing the air or vapor that may be admitted to the barrel or other receptacle containing the "preserve" whenever any of the contents are removed.

It is a well-known fact that any preserve put up in the ordinary way without the use of deleterious so-called "preservatives" cannot be exposed any length of time to the atmosphere without being subjected to a decay or fermentation. The usual way in which these have been kept indefinitely is by sealing in cans, jars, or other receptacle holding a quantity suitable to the immediate needs of the consumer. By the means I employ I am enabled to take a receptacle of any size whatever, filled and closed in the ordinary manner, and draw or remove therefrom any desired quantity whatever without in any way doing injury to the remaining contents. The preserve may be the unfermented juice of the grape or other fruit or may be the fruit itself in a liquid or semiliquid form. I do not wish to limit myself in any way to the class of product to be treated, for the process is generally applicable to whatever product is sealed while in a heated condition and which is liable to be spoiled by subsequently coming into contact with the atmosphere.

The manner of carrying out my invention is best shown by illustration. I have shown a very simple means, but do not wish to be considered as limiting myself to this precise way of achieving my result.

Having reference to the drawing, A represents a receptacle of any suitable size, form, or material having been filled—as, for instance, with unfermented grape-juice—and then hermetically sealed. As in all cases of similar preservation of products the sealing is done while the material is still hot. A partial vacuum in the receptacle is thus formed. In the lower part of the receptacle is a cock 2 or other closable passage through which the contents may be drawn off at any time, and in the receptacle, above the liquid, is another cock 3 or suitable closable passage through which sterilized vapor or air is to be admitted. This sterilization is effected as by means of an alcohol-flame 4, placed immediately below the mouth of the cock 3. The moment this cock is turned the flame is drawn into the closed chamber after the manner of a "Bunsen" or "Argand" burner. In other words, the oxygen of the air is consumed, and the heated products entering the chamber are sterilized and occupy the space above the liquid when the contents are withdrawn. The pressure within and without the cask now having been equalized, the cock 2 may be opened and any quantity of the contents or such as is necessary for immediate use is drawn off. By the withdrawal of the liquid the heated vapor continues to be drawn in through the cock 3. That the flame may not be deflected by drafts, &c., thereby allowing the injection of ordinary air, and also that the proper quantity of air may be fed to the flame, I may provide a shielding tube or funnel 5 for the flame. When the cock 2 is turned off, the cock 3 is also closed and the cask is again hermetically sealed. The remaining contents will keep as well as though the cask had never been opened. This operation may be repeated, with the same unvarying results, as many times as desired or as long as anything remains in the cask. It is the intention to utilize this principle of preserving with many forms of fruit, and even vegetables or other food products that can be reduced to a liquid or semiliquid state.

The advantage of being able to put up products in any quantity is obvious for many reasons—as, for instance, in large preserving establishments it enables the handling of a greatly-increased amount of material during the brief season of activity. Here the fruit may be preserved and sealed in large casks, and whenever desired it may be run into smaller receptacles. It often enables a crop to be saved that would partially, at least, be lost if a large part of the energies and facilities at hand had necessarily to be used in filling and soldering or sealing cans, jars, &c.

Having thus described my invention, what I claim as new, and desire to secure by Letters Patent, is—

1. The combination of a sealed vessel adapted to contain a preserve, a draw-off connecting with the lower portion of the vessel; a valve-controlled air-inlet pipe entering the upper portion of the vessel and adapted to communicate with the space above the preserve, a means for producing a flame about the entrance to the air-inlet for consuming the oxygen of the air and sterilizing said air as it enters the vessel to fill the vacuum produced by drawing off the contents of the vessel, and means for directing the flame into the mouth of the inlet whereby the injection of ordinary air is prevented.

2. The combination with a sealed vessel adapted to contain a preserve in liquid or semiliquid form, of an air-inlet, a flame-producing medium proximate to and in line with the entrance to said inlet, and a shield surrounding the flame to prevent deflection of air.

In witness whereof I have hereunto set my hand.

FRANK BUTCHER.

Witnesses:
S. H. NOURSE,
CHAS. E. TOWNSEND.